United States Patent
Burel et al.

(10) Patent No.: US 10,479,309 B2
(45) Date of Patent: Nov. 19, 2019

(54) STEERING WHEEL UNIT

(71) Applicant: AUTOLIV DEVELOPMENT AB, Vargarda (SE)

(72) Inventors: Jean-Yves Burel, Bully (FR); Rémi Baillivet, Dampierre-en Bray (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 62 days.

(21) Appl. No.: 15/747,616

(22) PCT Filed: Aug. 5, 2016

(86) PCT No.: PCT/EP2016/068717
§ 371 (c)(1),
(2) Date: Jan. 25, 2018

(87) PCT Pub. No.: WO2017/021519
PCT Pub. Date: Feb. 9, 2017

(65) Prior Publication Data
US 2018/0215337 A1    Aug. 2, 2018

(30) Foreign Application Priority Data

Aug. 5, 2015  (DE) .................. 10 2015 010 099

(51) Int. Cl.
*B60R 21/203*  (2006.01)
*B60R 21/017*  (2006.01)

(52) U.S. Cl.
CPC ........ *B60R 21/2037* (2013.01); *B60R 21/017* (2013.01)

(58) Field of Classification Search
CPC ............................................... B60R 21/2037
See application file for complete search history.

(56) References Cited

U.S. PATENT DOCUMENTS 5,593,178 A  *  1/1997  Shiga .................... B60Q 5/003
                                                        200/61.55
5,738,369 A  *  4/1998  Durrani ................. B60Q 5/003
                                                        280/728.2

(Continued)

FOREIGN PATENT DOCUMENTS

DE        199 27 032 A1    12/2000
DE    20 2005 019 960 U1    5/2006

(Continued)

OTHER PUBLICATIONS

International Search Report of PCT/EP2016/068717, dated Nov. 18, 2016.

*Primary Examiner* — Nicole T Verley
(74) *Attorney, Agent, or Firm* — Brinks Gilson & Lione

(57) ABSTRACT

A steering wheel unit, including a steering wheel body (10), an airbag housing (30) in the hub region of the steering wheel body with an airbag (38); First positioning units (40) between the steering wheel body (10) and the airbag housing (30) that position the airbag housing (30) on the steering wheel body (10) in the axial direction; Second positioning units between the steering wheel body (10) and the airbag housing (30) position the airbag housing (30) on the steering wheel body (40) in the radial plane. The second positioning unit includes at least one positioning element (52, 62) having a contact surface (56, 66*a*, 66*b*), normal or surface normals are perpendicular to the axial direction; and an opposing contact surface (58, 68*a*, 68*b*) for the contact surface (56, 66*a*, 66*b*). The positioning element (52, 62) includes at least one elastically deformable positioning section (54, 64*a*, 64*b*).

9 Claims, 5 Drawing Sheets

(56) References Cited

U.S. PATENT DOCUMENTS

| | | | | |
|---|---|---|---|---|
| 6,675,675 B1* | 1/2004 | Sauer | ................. | B60R 21/2037 |
| | | | | 280/731 |
| 7,556,281 B2* | 7/2009 | Olesko | ................ | B60R 21/2035 |
| | | | | 280/728.2 |
| 7,784,825 B2* | 8/2010 | Frisch | ................ | B60R 21/2035 |
| | | | | 200/61.55 |
| 7,789,415 B2* | 9/2010 | Groleau | ............. | B60R 21/2037 |
| | | | | 280/728.2 |
| 8,087,691 B2 | 1/2012 | Nebel et al. | | |
| 8,608,194 B2* | 12/2013 | Marotzke | ............ | B60R 21/2037 |
| | | | | 280/728.2 |
| 8,616,577 B1* | 12/2013 | Matsu | ................ | B60R 21/2037 |
| | | | | 280/728.2 |
| 9,403,552 B2* | 8/2016 | Onohara | ............ | B60R 21/2037 |
| 9,592,783 B2* | 3/2017 | Nebel | ................ | B60R 21/2037 |
| 2005/0012310 A1* | 1/2005 | Rhea | ..................... | B60Q 5/003 |
| | | | | 280/731 |
| 2007/0138771 A1 | 6/2007 | Schuetz et al. | | |

FOREIGN PATENT DOCUMENTS

| | | | |
|---|---|---|---|
| DE | 10 2008 028 126 A1 | 12/2009 | |
| DE | 202011109930 U1 * | 7/2012 | ......... B60R 21/2037 |
| DE | 10 2014 000 587 A1 | 7/2015 | |
| EP | 3178707 A1 * | 6/2017 | ......... B60R 21/2037 |
| WO | WO 2010/078896 A1 | 7/2010 | |
| WO | WO 2013/080753 A1 | 6/2013 | |

* cited by examiner

STEERING WHEEL UNIT

CROSS-REFERENCE TO RELATED APPLICATIONS

This application is a 35 U.S.C. § 371 national phase application of PCT International Application No. PCT/EP2016/068717, filed Aug. 5, 2016, which claims the benefit of priority under 35 U.S.C. § 119 to German Patent Application No. 10 2015 010 099.8, filed Aug. 5, 2015, the contents of which are incorporated herein by reference in their entirety.

FIELD OF THE INVENTION

The invention relates to a steering wheel unit for a motor vehicle.

BACKGROUND

Nearly every steering wheel unit of a motor vehicle includes an airbag module. As a rule, the steering wheel unit includes a steering wheel body and an airbag module accommodated in the hub region of this steering wheel body. The airbag housing of the airbag module is covered by a cover that forms one part of the surface of the steering wheel. As a rule, the surface of the cover also serves as an actuation surface for the car horn such that when a force that exceeds a predetermined value is exerted on the cover, the horn is activated. Here there are in principle two known concepts, i.e. the so-called "floating cover" concept, wherein the housing is rigidly connected to the steering wheel body, and the cover can be pressed down relative to the housing and relative to the steering wheel body; and the so-called "floating module" concept, wherein the cover is rigidly connected to the housing, and the cover, along with the housing, can be pressed down against the steering wheel body, the housing and the steering wheel body being connected to each other by horn springs. Recently, stationary or nearly stationary systems have also become known, which do not have any horn springs, but rather wherein the housing, with a corresponding force transfer, is not moved at all, or practically not at all, against the steering wheel body. In this case, the classic horn contacts are replaced, for example, by piezo-electric elements.

In the case of the aforementioned floating-module steering wheel units, positioning units are provided that position the airbag housing in both axial direction and in the radial plane on the steering wheel body. For example, with the above-mentioned type, separate first positioning units are provided for this purpose, which serve the purpose of axial positioning, and second positioning units, which serve the purpose of positioning in the radial plane, are provided. In the aforementioned document of the above-described type, three second positioning units are also provided, wherein each of these second positioning units is constructed as follows: from the bottom of the airbag housing, a pin serving as a positioning element extends in axial direction, the outer surface of the pin serving as contact surface. This pin extends into a through-hole through a component of the steering wheel body, the inner surface of which body forming the opposing contact surface for the contact surface. Due to production tolerances, it is practically impossible to avoid providing a degree of clearance between the contact surfaces and the opposing contact surfaces, which in turn can lead to noise generation and of the contact surfaces and the opposing contact surfaces.

With this as a starting point, the object of the present invention is to improve a steering wheel unit of the above-described type in such manner that the positioning accuracy is improved and ideally, zero backlash is achieved between the contact surfaces and the opposing surfaces of the positioning unit (non-axial positioning unit). Furthermore, in so doing, the functional reliability of the steering wheel is to be ensured, even when the gas generator is activated.

SUMMARY

This object is achieved by a steering wheel in accordance with embodiments of this invention including those described herein.

According to an embodiment of the invention, the positioning element of at least one second positioning unit features at least two sections, i.e. a positioning section that is elastically deformable perpendicular to the axial direction and a rigid, movement-limiting section that is arranged on a side of the positioning section facing away from the contact surface and which is arranged at a distance from the positioning section. Using the elastically deformable positioning section, a tolerance compensation and potentially also zero play are achieved. However, without additional measures, the deformability of the positioning section could, with the expansion of the airbag, and in particular in the event of a collision, lead to the airbag housing being deflected so far in the radial plane relative to the steering wheel body that an unlocking of the first positioning units could occur. In order to prevent this, the rigid movement-limitation section is provided, which permits movement of the airbag housing in the radial plane only to an extent that does not result in an unlocking of the first positioning unit. In this way, the providing of additional prevention measures can, in particular, be dispensed with.

In principle, the positioning element of a second positioning unit can extend either from the airbag housing or from the steering wheel body, wherein it is preferable that the positioning element extend from the base of the airbag housing, which makes it possible, in particular, to form it as an integral part of the base of the housing, particularly when the housing is a plastic element produced wholly or in part in an injection molding process.

As known in principle from the prior art, it is also preferable that the contact surface of the positioning section be formed convex. Here the positioning section preferably has the shape of a hollow half cylinder.

In order to achieve that, the positioning section is not only elastically deformable but also that its width can vary elastically, the positioning section preferably has a slot extending in the axial direction.

In the case of a first type, the positioning element has precisely one positioning section having a convex contact surface, and the opposing contract surface has a complementary-concave main section against which the contact surface abuts. Here, the contact surface is preferably a section of a cylinder surface. In this case, in order to further improve the deformation limitation, a secondary section is attached to each end of the main section, wherein a part of the movement-limiting section is arranged between the two secondary sections, however at a distance from them.

In a second type, the positioning element has two positioning sections, between which the movement-limiting section is disposed.

In a particularly preferred embodiment, the steering wheel unit has two second positioning units of the first type and a second positioning unit of the second type. In this way, a very precise positioning can be achieved at the same time as a static redundancy is avoided.

The steering wheel unit can be designed as a classic "floating module steering wheel unit" wherein the airbag housing can be pressed down, against the force of spring elements, against the steering wheel body, so that the first positioning units only position the airbag, in its non-pressed down state, in the axial direction on the steering wheel body. However the invention can also be used in steering wheel units wherein no significant movement between airbag housing and steering wheel body takes place when the driver presses on the cover of the airbag housing in order to activate the horn.

DESCRIPTION OF THE DRAWINGS

The invention will now be explained in more detail on the basis of an exemplary embodiment with reference to the Figures.

DETAILED DESCRIPTION

Figure 1:
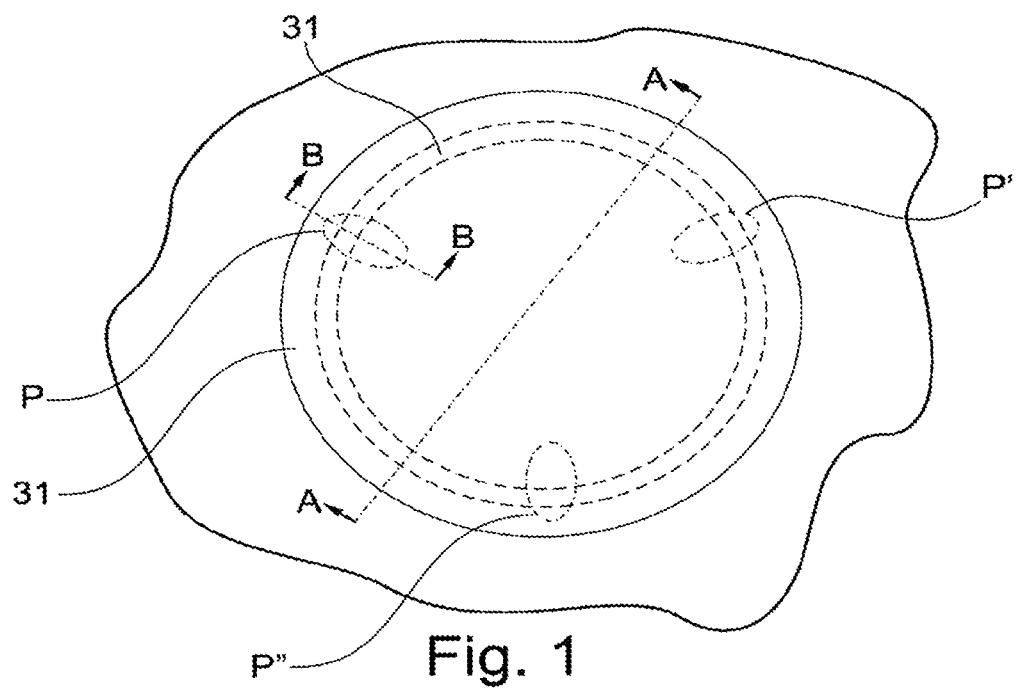
FIG. 1 shows a schematic top view of the hub region of a steering wheel unit.
Figure 2:
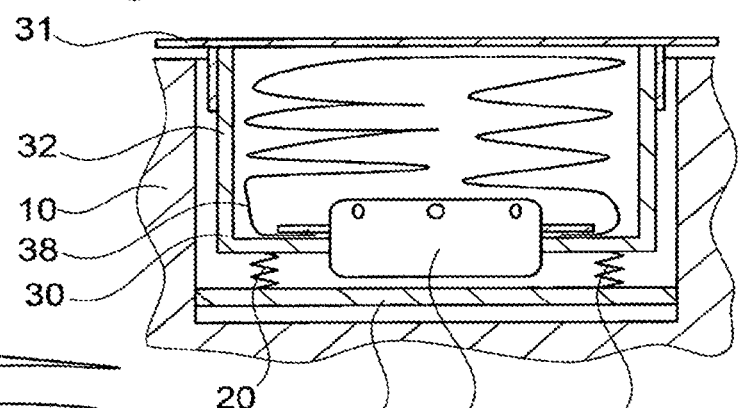
FIG. 2 shows a cross-section along the plane A-A in FIG. 1.

FIGS. 1 and 2 show a part of a steering wheel unit which, for activation of the horn, features a so-called "floating module." This means that the steering wheel unit is essentially formed of a steering wheel body 10 and an airbag module in a recess in the hub region of the steering wheel body 10 that can be pressed down against the force of the horn springs 20. The airbag module here features an airbag housing 30, a cover 31 that is rigidly connected to the airbag housing, an airbag 35 that is folded into the airbag housing, and a gas generator 36 that is held on the airbag housing.

The airbag housing 30 is connected by the horn springs 20 to a part of the steering wheel body 10, i.e. to a retaining plate 14. This retaining plate 14 can be formed in particular of metal, wherein it can be advantageous to overmold this metal retaining plate 14, at least in sections, with plastic material. A plurality of horn contacts 23, 33 are provided, wherein, in each instance, two horn contacts of a pair face each other in the usual way.

In order to retain and position the airbag housing 30 on the steering wheel body 10, a plurality of positioning units are provided. A total of three first positioning units 40 are provided, which serve the purpose of axial positioning, and in addition, three second positioning units are provided, which serve the purpose of positioning the airbag housing 30 in the radial plane. In each instance, a first and a second positioning unit are located adjacent to each other, and the positions of the positioning-unit pairs are designated in FIG. 1 with the reference numbers P, P' and P'''.

All first positioning units 40 are identically constructed and are described in more detail below, in particular with reference to the FIGS. 3, 4, 6 and 7.

There are two types of second positioning units, i.e. the second positioning units of the first type, which are located in the positions P and P', and a second positioning unit of the second type, which is located in the position P'''.

Figure 7:
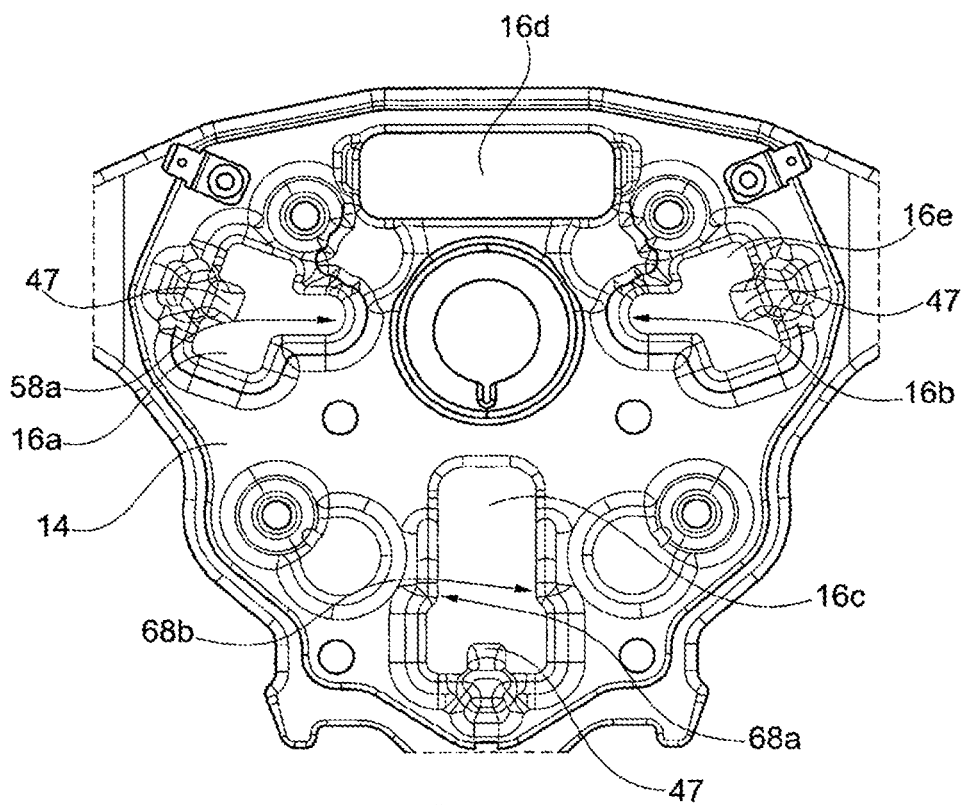
FIG. 7 shows a retaining plate that is part of the steering wheel body.

All positioning units have a housing-side part and a steering-wheel body part. The steering-wheel body parts are in each case sections of the retaining plate 14, so they will be discussed first with reference to FIG. 7. FIG. 7 shows the retaining plate 14 in a view from above, i.e. as seen from the airbag housing 30. The retaining plate 14 features five through-holes 16a to 16e, wherein the first three through-holes 16a to 16c belong to the positioning units. Here, each of the first three through-holes 16a to 16c is both part of a first positioning unit and part of a second positioning unit.

A projection 47 projects into each of the three through-holes 16a to 16c, the downward-directed surface 48 of the projection 47 (see FIG. 3) serving as a retaining surface for a first positioning element on the airbag housing side. In addition, each of the first two through-holes, 16a and b, each feature an opposing contact surface with a concave, that is to say semicircular main section 58a and secondary sections 58b and 58c that extend from this main section 58a (see, in this respect, also FIG. 8). The third through-hole 16c features two opposing contact surfaces 68a and 68b that face each other.

The fourth through-hole 16d serves as a passage for a ground connection 34 (see in this respect FIG. 4), the fifth through-hole 16a serves the purpose of providing access to the ignition bushing of the gas generator 36.

Figure 3:
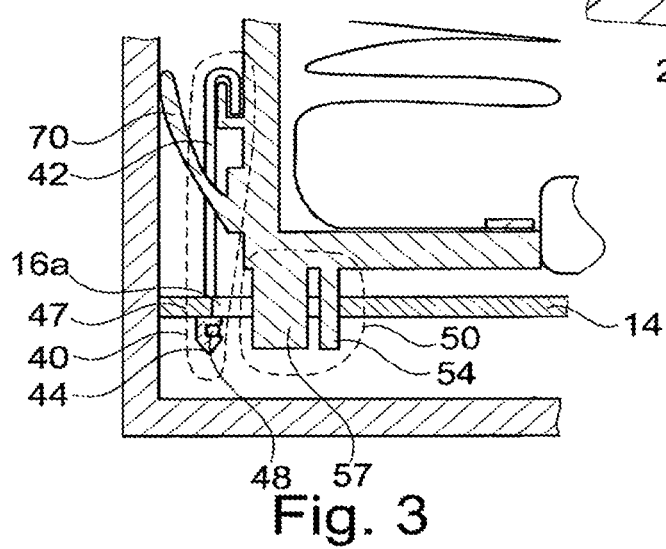
FIG. 3 shows a cross-section along the plane B-B in FIG. 1.
Figure 4:
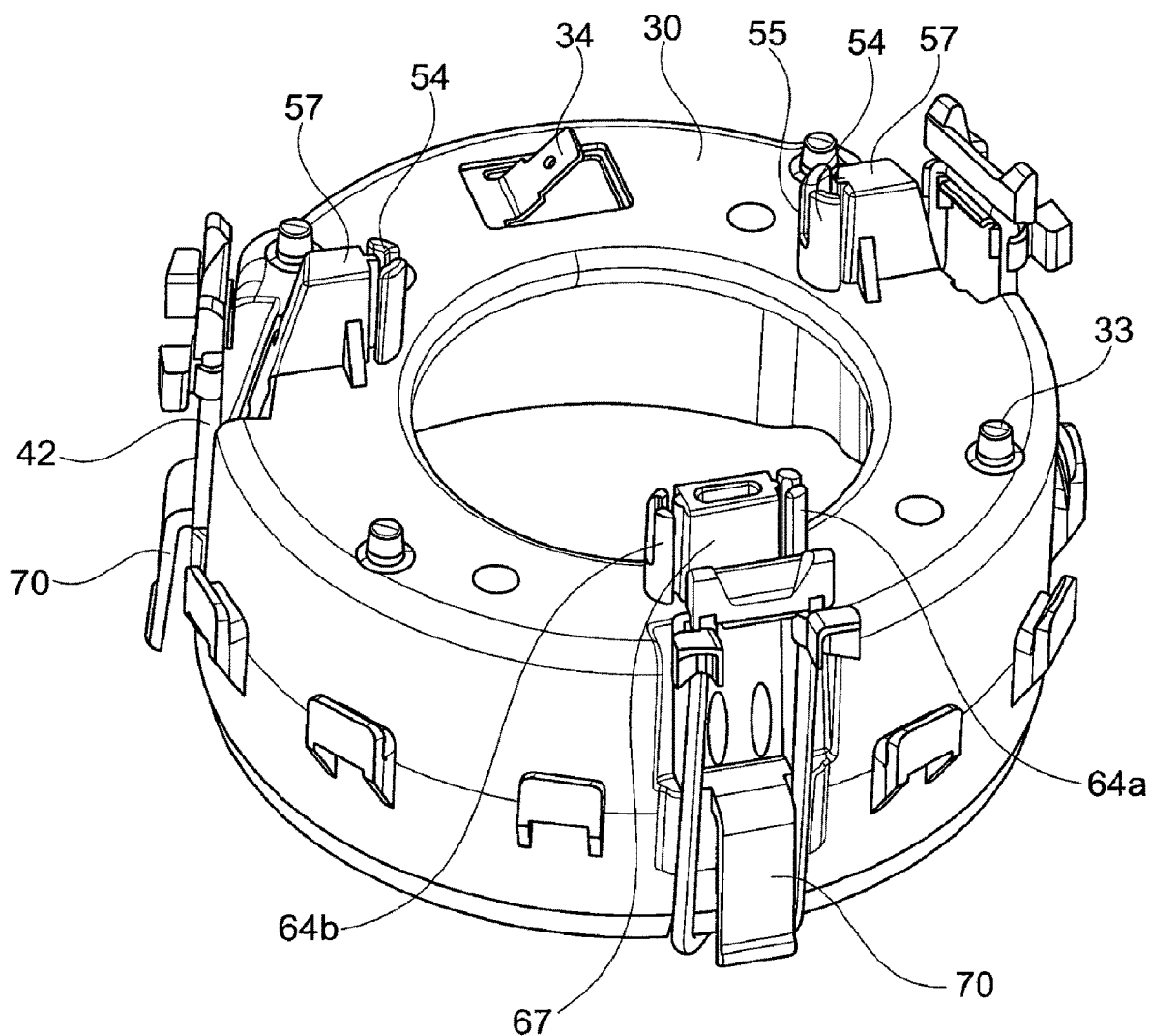
FIG. 4 shows the housing of the steering wheel unit in FIGS. 1 to 3 in a detailed perspective representation.
Figure 6:
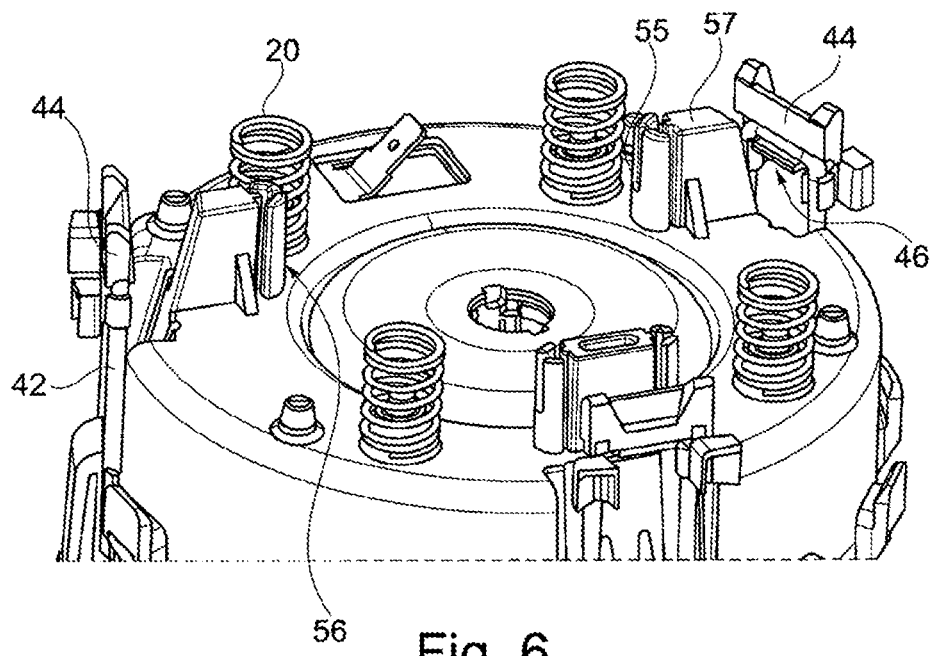
FIG. 6 shows the elements shown in FIG. 5 in a perspective representation.

As can be seen in particular from FIGS. 3, 4, 6, the housing-side elements of the first positioning units 40 consist in each case of a wire bracket 42 and a plastic element 44 which is latched onto this bracket 42, the upward-facing surface 46 of the plastic element being in contact with the downward-pointing surface 48 of the associated projection 47. Assembly takes place with elastic deformation of the bracket 42. As no additional retaining elements are provided, it is important that no unlocking of the first positioning units 40 occurs during ignition of the gas generator 36 and expansion of the airbag 38. In order to ensure this, and nevertheless achieve a tolerance compensation, the two positioning units, and here, in particular, the housing-side positioning elements 52 and 62, are constructed as follows.

First the two positioning elements of the first type are described. With regard to these two positioning elements, the housing-side positioning element 52 designated by the circle 50 in FIG. 3, which in each instance interacts with an opposing contact surface, consists of two sections, that is to say a positioning section 54 and a movement-limiting section 57. Both sections extend in the axial direction from the bottom of the airbag housing 30 and can, in particular, form an integral part of the same, particularly if the airbag housing is wholly or partially a plastic injection-molded part.

Figure 5:
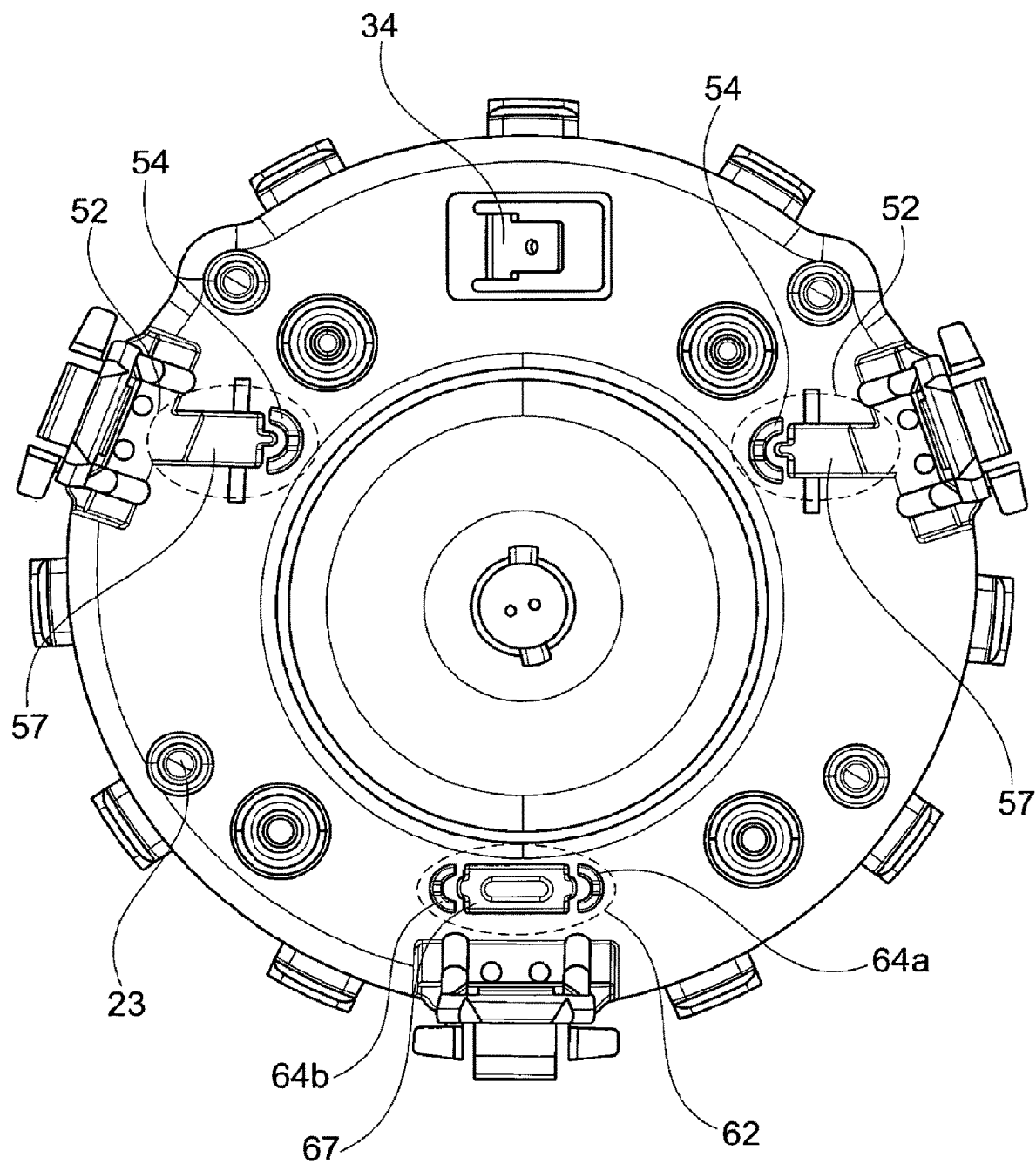
FIG. 5 shows the housing in FIG. 4 with an installed gas generator in a top view from below.
Figure 8:
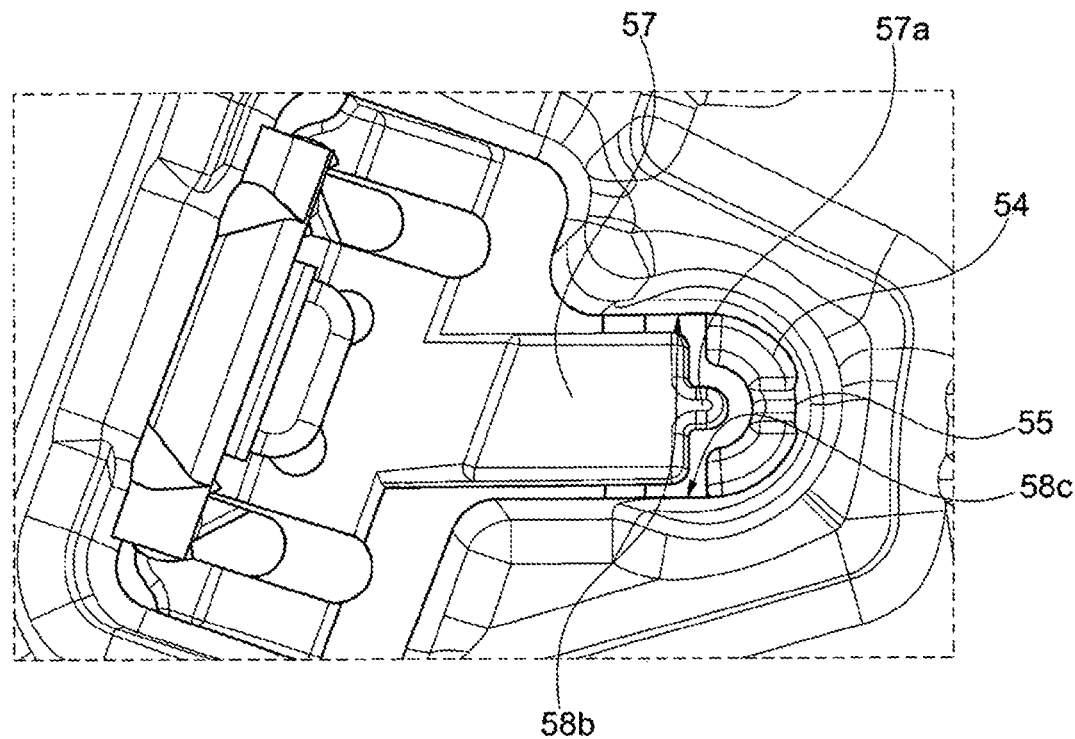
FIG. 8 shows a second positioning unit of a first type in a representation corresponding to FIG. 7.

As can be seen in particular from FIGS. 5 and 8, the positioning sections 54 are each formed as a hollow half cylinder that is divided into two symmetrically identical parts by a slot 55 running in the axial direction. This results in a certain elastic mobility of the two parts of the hollow half cylinder, both toward each other and also toward the movement-limiting section 57. The outer side (i.e. the outer surface) of the positioning section 44 forms the contact surface 56, which follows the shape of the concave main section 58a of the opposing contact surface 58.

The movement-limiting section 57 is spaced from the positioning section 54, wherein the distance can be, for example, 0.8 mm. A front protrusion 57a of this movement-limiting section 57 extends essentially to the central axis of the hollow half cylinder of the positioning section 54. The movement-limiting section 57 is designed block-shaped and thus rigid. The secondary sections 58b and 58c of the opposing contact surface 58 extend above the front edge of the movement-limiting section 57.

Due to the design of the positioning section 54, it has, as already mentioned, a certain elasticity, thereby enabling a tolerance compensation, by which essentially clearance-free guiding in the main section 58a of the opposing contact surface 58 is also made possible. However, the maximum deformation of the positioning section 54 is limited by the movement-limiting section 57, because if there is a deflection that is too strong, either the positioning section 54 or one of the secondary sections 58b, 58c, comes into contact with the movement-limiting section 57. This has the effect that even when there is ignition of the gas generator and subsequent expansion of the airbag in the event of a collision, during which very powerful forces can arise, the movement of the airbag housing 30 in the radial direction is limited, so that an undesired unlocking of the first positioning units is securely prevented.

Figure 9:
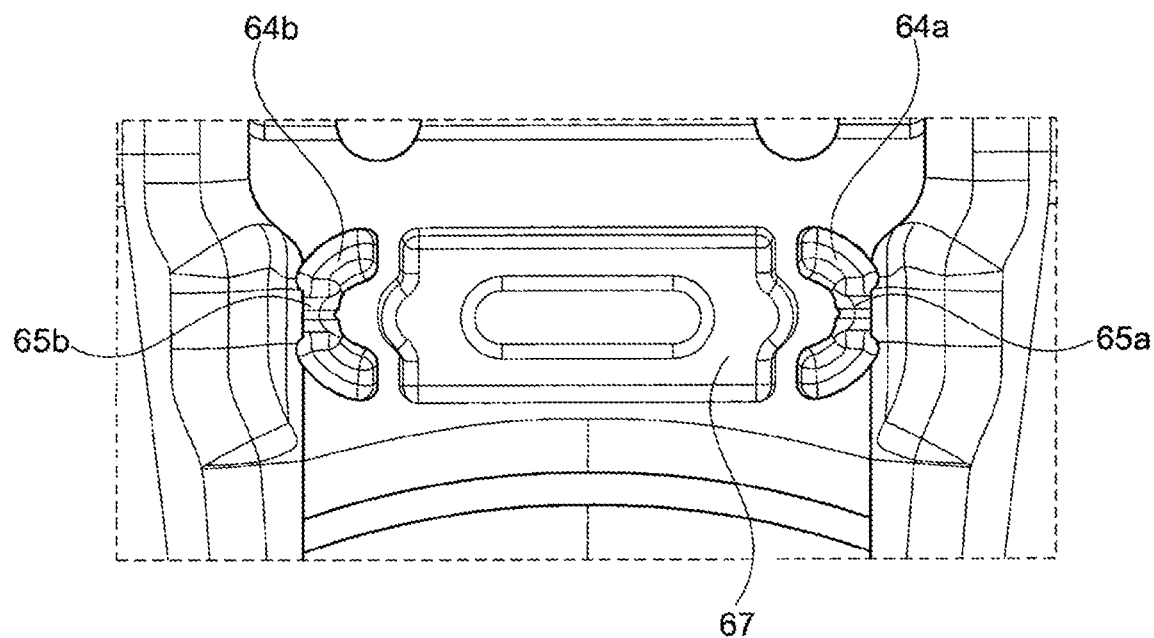
FIG. 9 shows a second positioning unit of a second type in a representation corresponding to FIG. 8.

The second positioning unit of the second type (see in his respect FIG. 9 in particular) is constructed similarly to the second positioning unit of the first type, which was just described above. The difference here is that two opposing positioning sections 64a, 64b, are provided, between which the movement-limiting section 67 is located. Here too the positioning sections 64a, 64b are designed as slotted hollow half cylinders. The opposing contact surfaces 68a, 68b have an essentially planar form, so that that an additional tolerance compensation can take place in the direction of the arrow. Here too, the movement-limiting section 67 limits the potential deformation of the positioning sections.

While the above description constitutes the preferred embodiment of the present invention, it will be appreciated that the invention is susceptible to modification, variation and change without departing from the proper scope and fair meaning of the accompanying claims.

The invention claimed is:

1. A steering wheel unit comprising;
a steering wheel body,
an airbag housing accommodated in a hub region of the steering wheel body wherein an airbag is accommodated,
first positioning units operating between the steering wheel body and the airbag housing, which the first positioning units position the airbag housing on the steering wheel body in an axial direction,
second positioning units operating between the steering wheel body and the airbag housing, the second positioning units position the airbag housing on the steering wheel body in a radial plane,
at least one of the second positioning units includes at least one positioning element extending in the axial direction including at least one contact surface having a surface perpendicular to the axial direction, and an opposing contact surface for the contact surface, and
the positioning element includes at least one positioning section including the contact surface, the positioning section is elastically deformable perpendicular to the axial direction, and a rigid movement-limiting section disposed on a side of the positioning section facing away from the contact surface and disposed spaced from the positioning section,
wherein the positioning element including the positioning section and the rigid movement-limiting section extends from a bottom of the airbag housing.

2. A steering wheel unit according to claim 1, further comprising the positioning element is formed as an integral part of the airbag housing.

3. A steering wheel unit according to claim 1, further comprising the positioning section essentially has the shape of a hollow half cylinder.

4. A steering wheel unit according to claim 1, further comprising the positioning section includes a slot that extends in the axial direction.

5. A steering wheel unit according to claim 1, further comprising the opposing contact surface includes a concave main section against which the contact surface abuts.

6. A steering wheel unit according to claim 5, further comprising in that a secondary section connects to ends of the main section, and in that a part of the movement-limiting section is positioned between two secondary sections but is spaced away from the secondary sections.

7. A steering wheel unit according to claim 1, further comprising the positioning element includes two of the positioning sections, and in that the movement-limiting section is disposed between the two positioning sections.

8. A steering wheel unit that features three of the second positioning units, wherein two of the second positioning units are formed according to claim 5.

9. A steering wheel unit according to claim 1, further comprising at least one spring element is provided, against whose force the airbag housing can be pressed down in the direction of the steering wheel body so that the first positioning units position the airbag housing, in a non-pressed down state, on the steering wheel body in the axial direction.

* * * * *